United States Patent
Mathew et al.

(10) Patent No.: US 9,806,633 B2
(45) Date of Patent: Oct. 31, 2017

(54) MODULAR MULTILEVEL CURRENT SOURCE AND VOLTAGE SOURCE CONVERTERS TO INCREASE NUMBER OF OUTPUT CURRENT LEVELS AND OUTPUT VOLTAGE LEVELS

(71) Applicant: Indian Institute of Technology Bombay, Mumbai (IN)

(72) Inventors: Ebin Cherian Mathew, Kottayam (IN); Anshuman Shukla, Samastipur (IN); Mahendra Ghat, Sangli (IN); Mukeshkumar Mohanbhai Bhesaniya, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/015,363

(22) Filed: Feb. 4, 2016

(65) Prior Publication Data

US 2016/0233762 A1    Aug. 11, 2016

(30) Foreign Application Priority Data

Feb. 6, 2015 (IN) ............................ 402/MUM/2015
Apr. 8, 2015 (IN) ......................... 1471/MUM/2015

(51) Int. Cl.
| | |
|---|---|
| H02M 7/49 | (2007.01) |
| H02M 3/07 | (2006.01) |
| H02M 3/04 | (2006.01) |
| H02M 7/483 | (2007.01) |

(52) U.S. Cl.
CPC ............... *H02M 7/49* (2013.01); *H02M 3/04* (2013.01); *H02M 3/07* (2013.01); *H02M 7/483* (2013.01); *H02M 2007/4835* (2013.01)

(58) Field of Classification Search
CPC .................................. H02M 3/04; H02M 7/49
USPC ......................................................... 363/60
See application file for complete search history.

(56) References Cited

U.S. PATENT DOCUMENTS

2009/0102436 A1* 4/2009 Escobar Valderrama ........... H02J 3/1857 323/207
2016/0211762 A1* 7/2016 Cheng .................. H02M 7/483

* cited by examiner

*Primary Examiner* — Jue Zhang
*Assistant Examiner* — Trinh Dang

(57) ABSTRACT

Embodiments herein provide a modular multilevel converter configured to increase one of number of an output voltage level and an output current level. The modular multilevel converter includes a plurality of legs where each leg includes a plurality of arms. Each arm of the modular multilevel voltage source converter includes a main wave shaping (WS) circuit, an auxiliary WS circuit and an arm inductor. The main WS circuit includes one or more half bridge sub-module(s) that includes a capacitor. The auxiliary WS circuit includes one or more full bridge sub-module(s) that includes a capacitor. Each arm of the modular multilevel current source converter comprises a plurality of half-bridge modules connected in parallel, and a plurality of arm capacitor connected across the plurality of half-bridge modules and one or more auxiliary full bridge module(s).

19 Claims, 9 Drawing Sheets

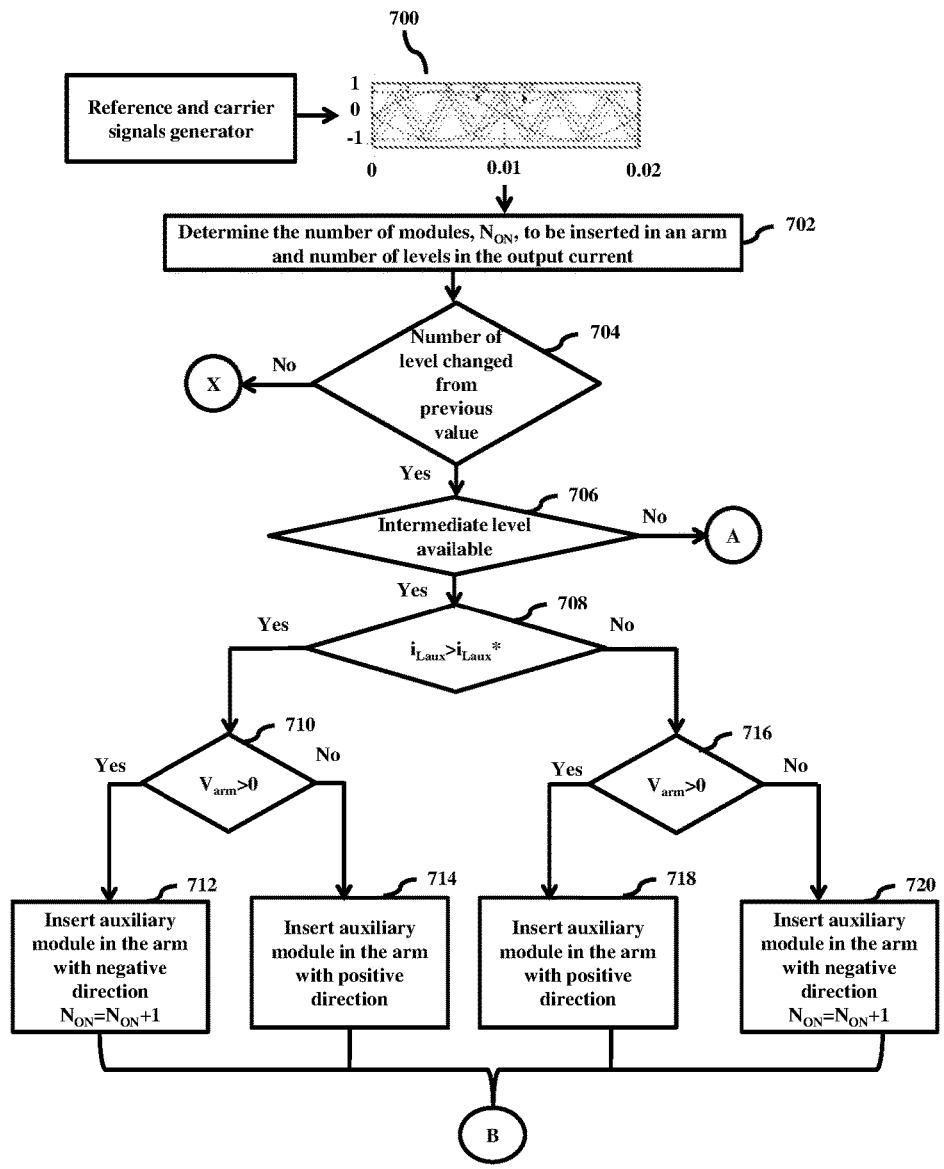

$i_{Lj}$ = $j^{th}$ module inductor current
ileum = auxiliary module inductor current
ileum* = auxiliary module inductor reference current
$V_{arm}$ = arm voltage

MODULAR MULTILEVEL CURRENT SOURCE AND VOLTAGE SOURCE CONVERTERS TO INCREASE NUMBER OF OUTPUT CURRENT LEVELS AND OUTPUT VOLTAGE LEVELS

TECHNICAL FIELD

The present invention relates to a modular multilevel converter. This application claims the benefit of Indian Complete Application Nos. 402/MUM/2015 and 1471/MUM/2015, filed on Feb. 6, 2015 and Apr. 8, 2015 respectively.

BACKGROUND

Recently, modular multilevel converters are gaining much attention in industry applications and academics. The main features of modular multilevel converters are reduced harmonics, lower switching frequency, and reduced stress on each device.

The modular multilevel converters have been used widely for a power application such as high voltage direct current (HVDC), flexible alternating current transmission system (FACTS), high/medium power drives application, and the like. The modular multilevel converter topology provides a modular structure and can be extended to any power requirements. The modular multilevel converter topology can be classified into two major categories: the modular multilevel voltage source converter and the modular multilevel current source converter.

The modular multilevel voltage source converter topology can increase the number of voltage levels by increasing the sub-module number. This will increase the number of switches required. Normally, this type of multilevel converter topology may obtain one or two extra voltage levels in the output level by increasing one sub-module. Hence, to get more number of levels in the output voltage, the large number of sub-modules is required. This results in increase in the control complexity, losses and cost of converter circuits.

Similarly, in the existing modular multilevel current source converter circuit topology, the number of output current levels is N+1 for N half bridge modules per arm and by increasing one half bridge module in an arm, one extra current level in the output is obtained. Hence, with the increase of the number of the output current level, the corresponding need to increase the number of modules makes the entire circuit very large and control may also become more complex. Reducing the number of the modules for the same number of output current level reduces costs and simplifies the control, while increasing the reliability of the system.

The above information is presented as background information only to help the reader to understand the present invention. Applicants have made no determination and make no assertion as to whether any of the above might be applicable as Prior Art with regard to the present application.

SUMMARY

Accordingly the embodiments herein provide a modular multilevel converter configured to increase one of number of an output voltage level and an output current level.

A modular multilevel voltage source converter includes a plurality of legs. Each leg includes a plurality of arms, and each arm comprises a main Wave Shaping (WS) circuit, an auxiliary WS circuit and an arm inductor. The main WS circuit includes one or more half bridge sub-module(s) that includes a capacitor. The auxiliary WS circuit includes one or more full bridge sub-module(s) that includes a capacitor. The modular multilevel voltage source converter is configured to increase number of voltage levels based on number of the full bridge sub-modules in the auxiliary WS circuit.

Accordingly the invention provides a method implemented in a modular multilevel voltage source converter. The method includes determining whether an intermediate level is available in the modular multilevel voltage source converter. Further, after determining that the intermediate level is available, the method includes measuring a voltage of a capacitor in a sub-module of an auxiliary Wave Shaping (WS) circuit in the modular multilevel voltage source converter. Furthermore, the method includes a performing charging the capacitor in the sub-module in the auxiliary WS circuit, or discharging the capacitor in the sub-module in the auxiliary WS circuit by comparing the voltage of the capacitor with a reference voltage of the capacitor.

A modular multilevel current source converter includes a plurality of legs. Each leg includes a plurality of arms, where each arm includes a plurality of half-bridge modules connected in parallel. A plurality of arm capacitor is connected across the plurality of half-bridge modules and at least one auxiliary full bridge module. The modular multilevel current source converter is configured to increase number of output current levels based on at least one the auxiliary full bridge module.

Accordingly the invention provides a method implemented in a modular multilevel current source converter. The method includes determining whether an intermediate current level is available in the modular multilevel current source converter. Further, the method includes inserting an auxiliary full bridge module present in the modular multilevel current source converter in response to determining that the intermediate current level is available and controlling inductor current in an auxiliary full bridge module. Further, the method includes bypassing an auxiliary full bridge module in response to determining that the intermediate current level is unavailable.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
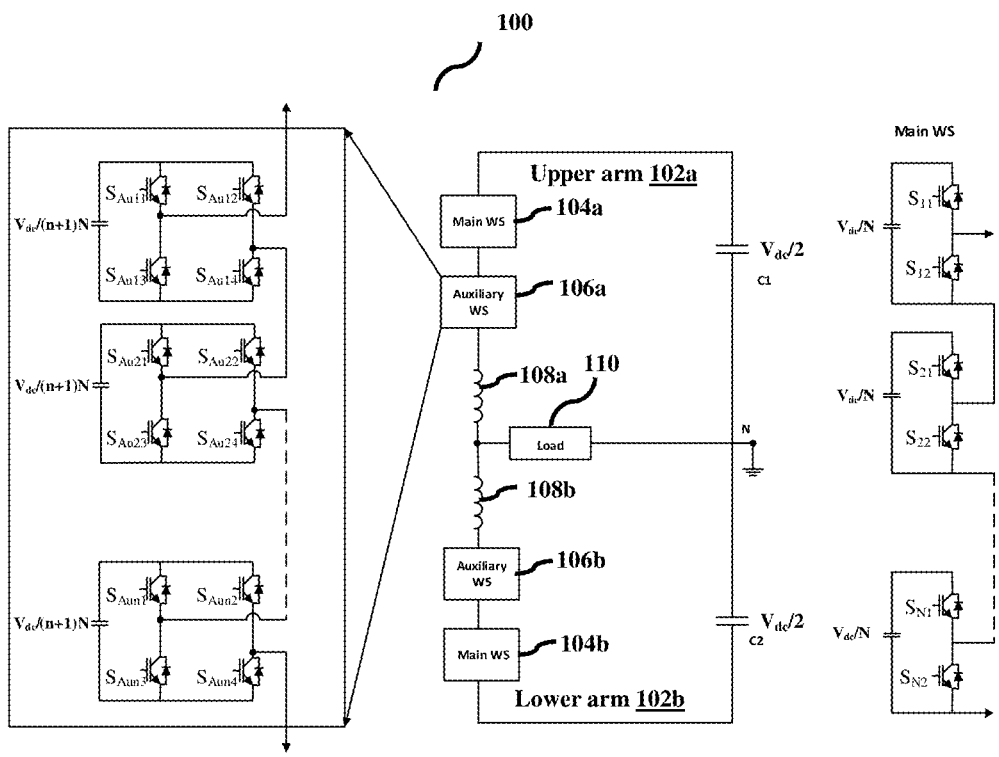
FIG. 1 is a schematic of a modular multilevel voltage source converter with a plurality of a full bridge sub-modules in auxiliary Wave Shaping (WS) circuits and a plurality of half bridge sub modules in main WS circuit in each arm, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a modular multilevel converter configured to increase one of number of an output voltage level and an output current level.

In an embodiment, the modular multilevel converter is a modular multilevel voltage source converter.

In an embodiment, the modular multilevel converter is a modular multilevel current source converter.

In an embodiment, the modular multilevel voltage source converter includes a plurality of legs. Each the leg includes a plurality of arms that includes a main Wave Shaping (WS) circuit, an auxiliary WS circuit and an arm inductor. The main WS circuit includes one or more half bridge sub-module(s) that includes a capacitor. The auxiliary WS circuit includes one or more full bridge sub-module(s) that includes a capacitor. The modular multilevel voltage source converter is configured to increase number of voltage levels based on number of the full bridge sub-modules in the auxiliary WS circuit.

In an embodiment, the modular multilevel voltage source converter is configured to insert the auxiliary WS sub-modules in order to increase number of the output voltage levels based on a capacitor voltage in the auxiliary WS sub-module and polarity of current in each arm.

In an embodiment, the modular multilevel voltage source converter is configured to balance a voltage of the capacitor in the full bridge sub-module of the auxiliary WS circuit.

Unlike the conventional systems, the proposed modular multilevel voltage source converter produces counter voltage at the time of a direct current (dc) side fault which will reduce the fault current. Unlike the conventional systems, the modular multilevel voltage source converter can generate intermediate voltage levels by using the auxiliary WS circuit.

Unlike the conventions systems, the modular multilevel converter is simple in structure, and easy to adopt. The modular multilevel converter has low switching losses, and a modular construction.

In an embodiment, the modular multilevel current source converter includes a plurality of legs. Each leg includes a plurality of arms, where each arm includes a plurality of half-bridge modules connected in parallel. A plurality of arm capacitors is connected across the plurality of half-bridge modules and at least one auxiliary full bridge module. The modular multilevel current source converter is configured to increase number of output current levels based on at least one the auxiliary full bridge module.

In an embodiment, the auxiliary full bridge module includes an inductor and a plurality of semiconductor switches.

In an embodiment, the modular multilevel current source converter is configured to insert the auxiliary full bridge modules in order to increase number of the output current levels based on the inductor current in the auxiliary full bridge module and polarity of voltage in each arm.

The embodiments disclosed herein achieve a method of inserting or bypassing an auxiliary full bridge module and controlling inductor current in the auxiliary full bridge module.

Unlike the conventional modular multilevel current source converter circuits, the proposed circuit topology and technique is able to generate the same number of levels in output current with reduced number of modules, simplifying circuit, saving devices and costs and improves reliability. By using an auxiliary full bridge module in the arm, the number of levels in the output current is increased. The auxiliary full bridge module is controlled such that it creates the intermediate current levels.

Further, the proposed modular multilevel current source converter will reduce harmonics because of higher number of levels in the output current. Also, small footprint because the ac side filters can be eliminated due to low harmonic distortion.

The modular multilevel converter can also be an alternate arm modular converter, a hybrid modular multilevel converter, or any other type of modular converter.

Referring now to the drawings and more particularly to FIGS. 1 through 10 where similar reference characters denote corresponding features consistently throughout the figures, there are shown preferred embodiments.

FIG. 1 is an example schematic of a modular multilevel converter (MMC) 100 with an auxiliary WS circuit 106a or 106b, according to the embodiments as disclosed herein. The modular multilevel converter 100 is a modular multilevel voltage source converter. The modular multilevel converter 100 includes an upper arm 102a and a lower arm 102b. The upper arm 102a includes a main WS circuit 104a, an auxiliary WS circuit 106a, and an inductor 108a (i.e., arm inductor). The lower arm 102b includes a main WS circuit 104b, an auxiliary WS circuit 106b, and an inductor 108b (i.e., arm inductor). The upper arm 102a and the lower arm 102b are connected with a load 110.

Each main WS circuits 104a, 104b include a set of half bridge sub-modules. Each set of sub-modules includes a capacitor and a set of switches $S_{11}$-$S_{12}$, $S_{21}$-$S_{22}$, and $S_{N1}$-$S_{N2}$. For example, $S_{11}$ and $S_{12}$ are complimentary to each other. The switches $S_{11}$, $S_{12}$ are electrically connected in series and are electrically arranged parallel to the capacitor. The switches $S_{21}$, $S_{22}$ are electrically connected in series and are electrically arranged parallel to the capacitor. The switches $S_{N1}$, $S_{N2}$ are electrically connected in series and are electrically arranged parallel to the capacitor. The set of switches are semiconductor switches, for example but not limited to, an Insulated Gate Bipolar Transistor (IGBT), a Gate Turn-Off Thyristor (GTO), an Integrated Gate-Commutated Thyristor (IGCT), a power MOSFET, a bipolar junction transistor, or the like.

Each auxiliary WS circuits 106a, 106b include a set of full bridge sub-module, where the sub-module includes a set of switches $S_{Aun1}$, $S_{Aun2}$, $S_{Aun3}$, and $S_{Aun4}$ and a capacitor (n=1, 2, . . . ). The switches $S_{Aun1}$, $S_{Aun2}$ are electrically connected in series and are electrically arranged parallel to the capacitor. The switches $S_{Aun3}$ and $S_{Aun4}$ are electrically connected in series and are electrically arranged parallel to the switches $S_{Aun1}$, $S_{Aun2}$. The set of switches can be semiconductor switches for example but not limited to, the IGBT, the GTO, the IGCT, the power MOSFET, the bipolar junction transistor, or the like.

In the upper arm 102a, the main WS circuit 104a is electrically connected with the auxiliary WS circuit 106a and the capacitor $C_1$. The auxiliary WS circuit 106a is arranged between the main WS circuit 104a and the inductor 108a. In the lower arm 102b, the main WS circuit 104b is electrically connected with the auxiliary WS circuit 106b and the capacitor $C_2$. The auxiliary WS circuit 106b is arranged between the main WS circuit 104b and the inductor 108b.

The modular multilevel converter 100 is configured to increase the voltage level based on the number of sub-modules in the auxiliary WS circuit 106a or 106b. As shown in the FIG. 1, the capacitor voltage of each sub-module in each main WS circuits 104a, 104b is maintained to a $V_{DC}/N$. This gives the output voltage in steps of $V_{DC}/N$ and output voltage can be obtained in the range of $V_{DC}/2$ to $-V_{DC}/2$. The output voltage levels are (N+1) in each main WS circuits 104a, 104b. The N is number of sub-modules in each main WS circuits 104a, and 104b.

In an example, the proposed scheme n extra auxiliary full bridge sub-modules in each arm are used. For n=1, the voltage level of this auxiliary sub-module is maintained to the $V_{DC}/2N$. Now by inserting positively or negatively, the proposed modular multilevel converter 100 can produce the intermediate voltage level of $V_{DC}/2N$. This will increase the output voltage levels to (2N+1) as that of (N+1) levels without auxiliary sub-module. Thus by inserting only one extra sub-module, the proposed modular multilevel converter 100 can nearly double the output voltage level. By using two full bridge auxiliary sub-modules (n=2) with the voltage level of $V_{DC}/3N$, the modular multilevel converter 100 can produce the (3N+1) output voltage levels. In general by using n extra auxiliary sub-module with voltage level of $V_{DC}/(n+1)N$, the modular multilevel converter 100 can produce the ((n+1)N+1) output voltage.

According to the configuration of the modular multilevel converter 100, the auxiliary WS circuits 106a, 106b are designed and operated easily because its modular configuration provides flexibility for easy expansion of the number of levels of its sub-modules without introducing undue complexity in the modular multilevel converter 100.

In an embodiment, if the modular multilevel converter 100 utilizes an asymmetric voltage for the auxiliary sub-modules then, the modular multilevel converter 100 is possible to obtain for higher number of voltage levels compared with symmetric voltages.

The modular multilevel converter 100 produces counter voltage at the time of the dc side fault which will reduce the fault current. The modular multilevel converter 100 can generate intermediate voltage levels by using the auxiliary WS circuit 106a.

Figure 2:
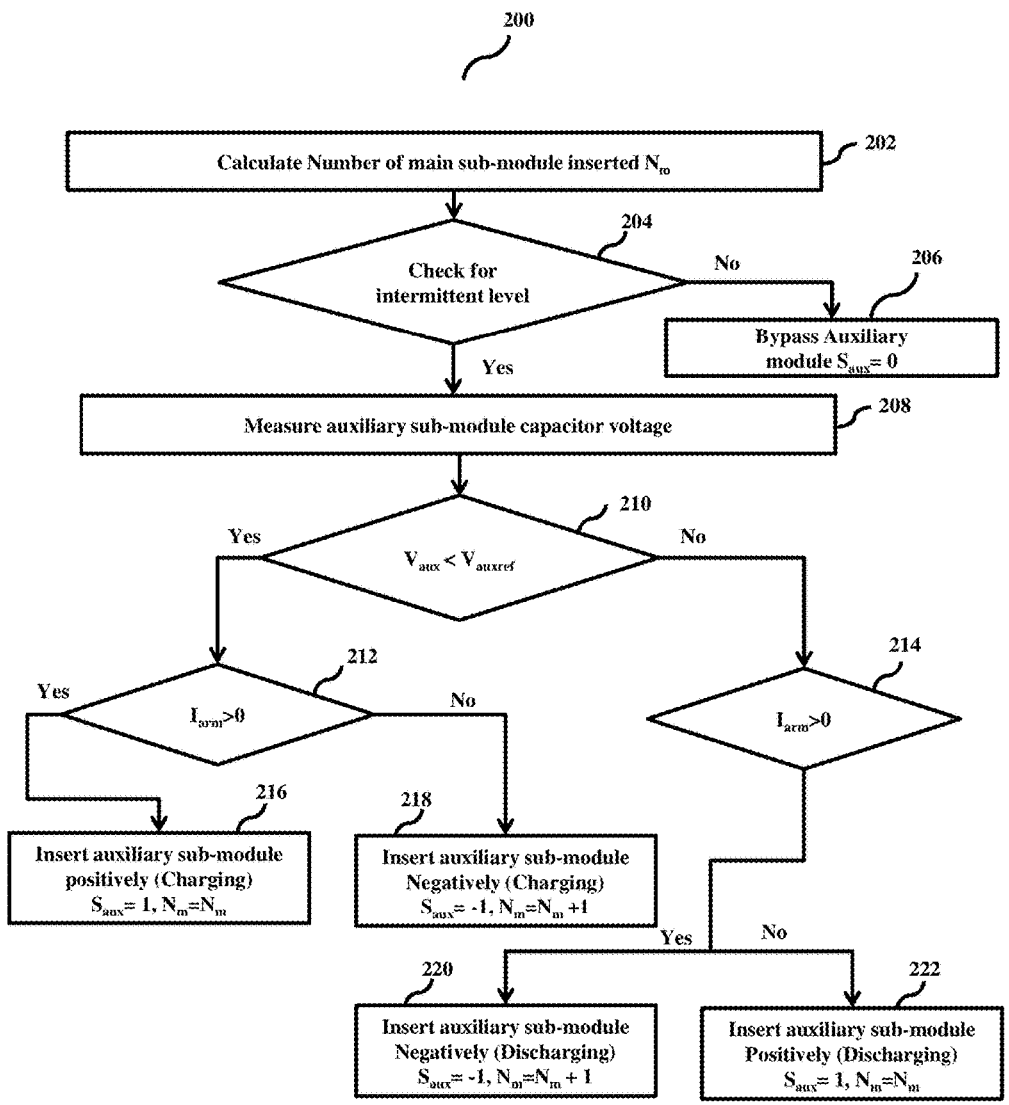
FIG. 2 is a flow diagram illustrating a method for balancing a capacitor voltage in a full bridge sub-module associated with an auxiliary WS circuit in a modular multilevel voltage source converter, according to the embodiments as disclosed herein.

FIG. 2 is a flow diagram illustrating a method 200 for balancing the capacitor voltage in the sub-module associated with the auxiliary WS circuit 106a or 106b in the modular multilevel voltage source converter 100, according to the embodiments as disclosed herein. At step 202, the method 200 includes calculating a number of sub-modules inserted in the main WS circuit 104a or 104b of the modular multilevel converter 100. In an embodiment, the number of sub-module inserted in the main WS circuit 104a or 104b is calculated by using a sorting and inserting technique known in the literature. At the step 204, the method 200 includes determining whether an intermediate level is available in the modular multilevel converter 100.

If it is determined, at step 204, that intermediate level is available in the modular multilevel converter 100, then at step 208, the method 200 includes measuring a voltage of the capacitor in the sub-module of the auxiliary WS circuit 106a or 106b in the modular multilevel converter 100. If it is determined, at step 204, that intermediate level is not available in the modular multilevel converter 100, then at step 206, the method 200 includes bypassing the capacitor in the sub-module of the auxiliary WS circuit (i.e. $S_{aux}=0$).

If it is determined, at step 210, that the voltage of the capacitor in the auxiliary WS circuit 106a or 106b is lesser than the reference voltage of the capacitor in the auxiliary WS circuit 106a or 106b, then at step 212, the method includes charging the capacitor in the auxiliary WS circuit 106a or 106b. If it is determined, at step 210, that the voltage of the capacitor in the auxiliary WS circuit 106a or 106b is not lesser than (i.e., greater than) the reference voltage of the capacitor in the auxiliary WS circuit 106a or 106b then, at step 214, the method 200 includes discharging the capacitor in the auxiliary WS circuit 106a or 106b.

During charging the capacitor in the sub-module in the auxiliary WS circuit 106a or 106b, if it is determined, at step 212, that the current in the upper arm 102a or the lower arm 102b is greater than zero then, at step 216, the method 200 includes inserting one or more sub-module in the auxiliary WS circuit 106a or 106b positively, and retaining same number of sub-module in the main WS circuit 104a or 104b.

During the charging the capacitor in the sub-module in the auxiliary WS circuit 106a or 106b, if it is determined, at step 212, that the current in the upper arm 102a or the lower arm 102b is not greater than zero then, at step 218, the method includes inserting one or more sub-module in the auxiliary WS circuit 106a or 106b negatively, and incrementing one sub-module in the main WS circuit 104a or 104b.

During the discharging the capacitor in the sub-module in the auxiliary WS circuit 106a or 106b, if it is determined, at step 214, that the current in the upper arm 102a or the lower arm 102b is greater than zero then, at step 220, the method includes inserting one or more sub-module in the auxiliary WS circuit 106a or 106b negatively, and incrementing one sub-module in the main WS circuit 104a or 104b.

During the discharging the capacitor in the sub-module in the auxiliary WS circuit 106a or 106b, if it is determined, at step 214, that the current in the upper arm 102a or the lower arm 102b is not greater than zero then, at step 222, the method includes inserting one or more sub-module in the auxiliary WS circuit 106a or 106b positively, and retaining same number of sub-module in the main WS circuit 104a or 104b.

In an embodiment, depending on current direction, the charging or discharging of the capacitor is determined. If the capacitor is in the charging mode, then the capacitor with a lower voltage level is switched ON. If the capacitor is in the discharging mode then, the capacitors with a higher voltage level are switched ON.

In an embodiment, the capacitor in the auxiliary WS circuit 106a or 106b is charged or discharged based on an average voltage of sub-module in the modular multilevel converter 100.

The sequence of steps (202 to 222) can be performed by using a microcontroller, a microprocessor, or any computer readable storage medium.

The various actions, acts, blocks, steps, and the like in the method 200 may be performed in the order presented, in a different order or simultaneously. Further, in some embodiments, some actions, acts, blocks, steps, and the like may be omitted, added, modified, skipped, and the like without departing from the scope of the invention.

Figure 3:
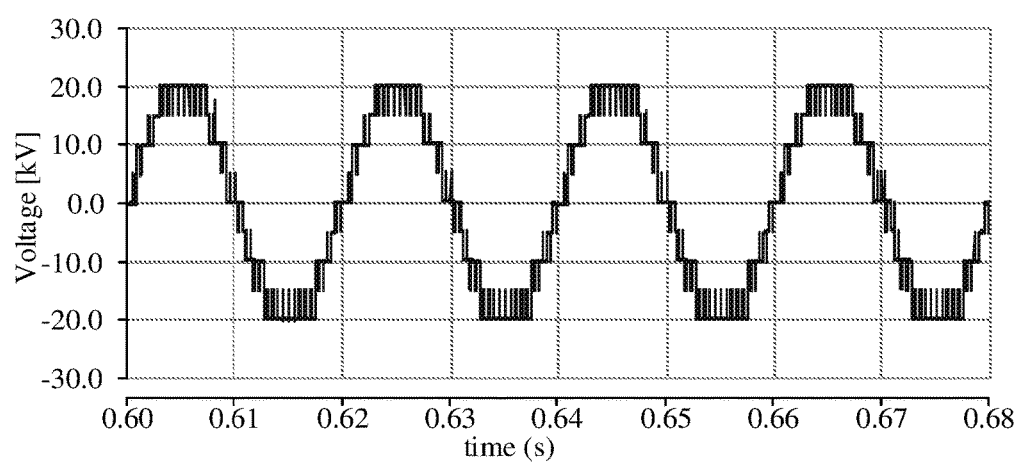
FIG. 3 is a graph showing an output voltage waveform of modular multilevel voltage source converter, according to the embodiments as disclosed herein.

FIG. 3 is a graph showing an output voltage waveform in the modular multilevel voltage source converter 100, according to the embodiments as disclosed herein. The output voltage waveform across the load in the modular multilevel voltage source converter 100 is represented by using the voltage and the time in a voltage versus time plot is based on the following parameter (DC link voltage—40 KV, Each sub-module voltage in main WS circuit—10 kV, sub-module voltage in auxiliary WS circuit—5 KV, number of main sub-module/arm—4, number of auxiliary sub-module/arm—1, sub-module capacitance—5000 µF, load resistance—50 Ω, and load Inductance—0.1 H). Here the level of output voltage is 9.

Figure 4:
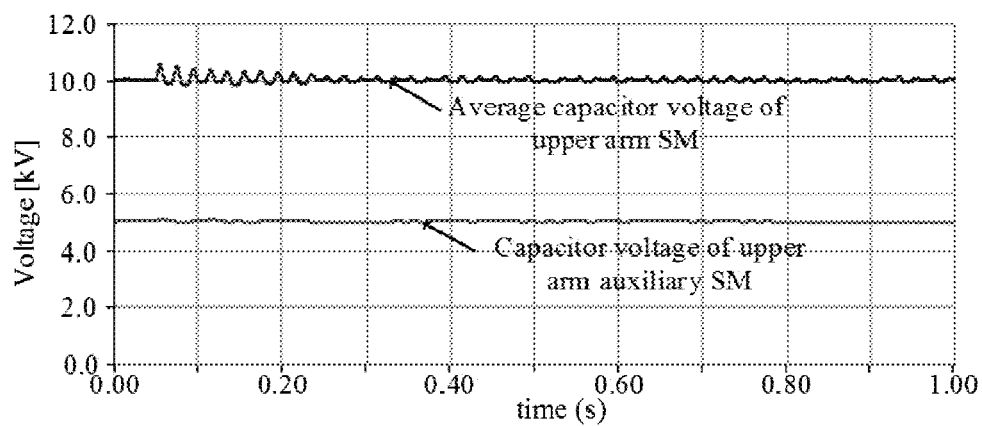
FIG. 4 shows an average capacitor voltage of a main WS sub-modules and a capacitor voltage of an auxiliary WS sub-module in an upper arm of modular multilevel voltage source converter, according to the embodiments as disclosed herein.

FIG. 4 shows the average capacitor voltage of the main WS 104a or 104b and capacitor voltage of the auxiliary WS 106a or 106b in the upper arm 102a in the modular multilevel voltage source converter 100, according to the embodiments as disclosed herein.

Figure 5:
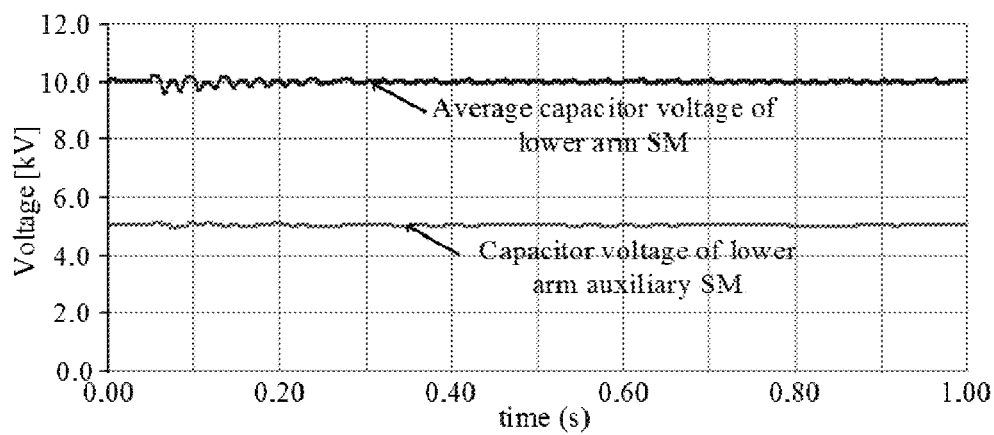
FIG. 5 shows an average capacitor voltage of a main WS sub-modules and a capacitor voltage of an auxiliary WS sub-module in a lower arm of modular multilevel voltage source converter, according to the embodiments as disclosed herein.

FIG. 5 shows the average capacitor voltage of the main WS 104a or 104b and capacitor voltage of the auxiliary WS 106a or 106b in the lower arm 102b in the modular multilevel voltage source converter 100, according to the embodiments as disclosed herein.

Figure 6:
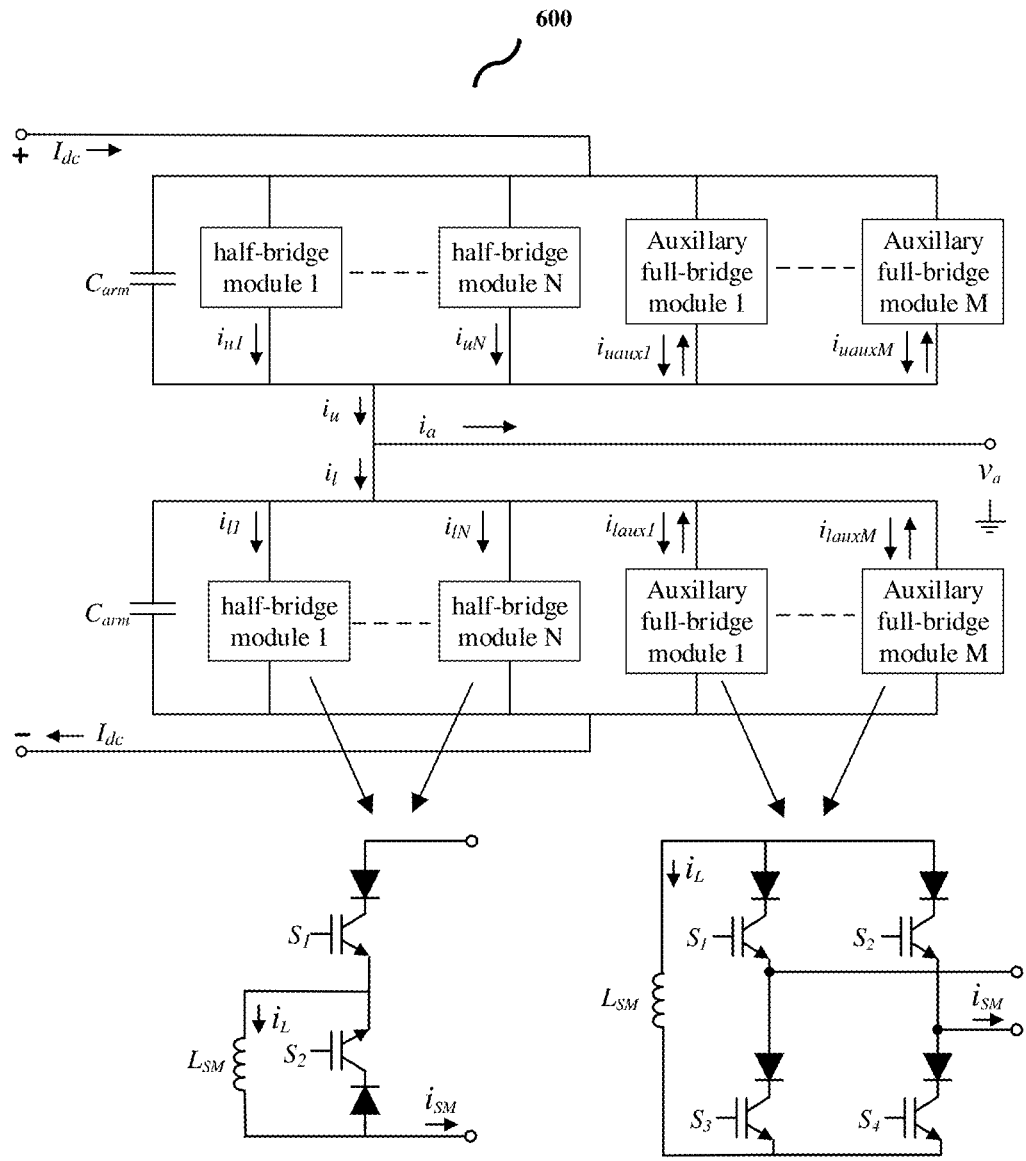
FIG. 6 shows a circuit configuration of a modular multilevel current source converter in which one arm of the converter consists of N half bridge modules and M auxiliary full bridge modules, according to embodiments as disclosed herein.

FIG. 6 shows the circuit configuration of the modular multilevel converter 600 in which one arm of the converter consists of N half bridge modules and M auxiliary full bridge modules, according to embodiments as disclosed herein. The modular multilevel converter 600 is a modular multilevel current source converter. The inductor current of each half bridge module is maintained at $2\,I_{dc}/(3N)$, and the inductor current of the auxiliary full bridge module is maintained at $2\,Idc/3(M+1)N$. In this circuit topology $(M+1)*N+1$ output current levels can be obtained.

In an embodiment, the intermediate current levels in the output current are obtained by inserting the auxiliary full bridge module in positive or negative direction. Hence, the output current is in steps of $I_{dc}/(3N)$ with the peak amplitude of $2\,I_{dc}/3$ as described in Table I below for M=1. Table I provides one of the possible switching states of upper arm half bridge modules and an auxiliary module for each current level of the modular multilevel current source converter 600 with four half bridge modules and the auxiliary module (1: Inserted, 0: Bypassed, +1: Inserted with positive direction).

TABLE I

| Module 1 | Module 2 | Module 3 | Module 4 | Auxiliary Module | Total current of upper arm modules | Total current of lower arm modules | Differential Current |
|---|---|---|---|---|---|---|---|
| 1 | 1 | 1 | 1 | 0 | $2I_{dc}/3$ | 0 | $2I_{dc}/3$ |
| 1 | 1 | 1 | 0 | +1 | $7I_{dc}/12$ | $I_{dc}/12$ | $I_{dc}/2$ |
| 1 | 1 | 1 | 0 | 0 | $I_{dc}/2$ | $I_{dc}/6$ | $I_{dc}/3$ |
| 1 | 1 | 0 | 0 | +1 | $5I_{dc}/12$ | $I_{dc}/4$ | $I_{dc}/6$ |
| 1 | 1 | 0 | 0 | 0 | $I_{dc}/3$ | $I_{dc}/3$ | 0 |
| 1 | 0 | 0 | 0 | +1 | $I_{dc}/4$ | $5I_{dc}/12$ | $-I_{dc}/6$ |
| 1 | 0 | 0 | 0 | 0 | $I_{dc}/6$ | $I_{dc}/2$ | $-I_{dc}/3$ |
| 0 | 0 | 0 | 0 | +1 | $I_{dc}/12$ | $7I_{dc}/12$ | $-I_{dc}/2$ |
| 0 | 0 | 0 | 0 | 0 | 0 | $2I_{dc}/3$ | $-2I_{dc}/3$ |

With the increase in the number of output current levels, nearly sinusoidal output current waveform can be generated.

In an embodiment, the auxiliary full bridge module is inserted either in the positive or negative direction based on the values of module inductor current and the polarity of arm voltage. The number of half bridge modules to be inserted is then adjusted according to the direction of auxiliary module insertion.

The modular multilevel current source converter 600 is able to generate the same number of levels in output current with reduced number of modules, simplifying circuit, saving devices and costs and improves reliability. By using an auxiliary full bridge module in the arm, the number of levels in the output current is increased. The auxiliary full bridge module is controlled such that it creates the intermediate current levels. The modular multilevel current source converter 600 will reduce harmonics because of higher number of levels in the output current. Also, small footprint because the ac side filters can be eliminated due to low harmonic distortion.

Figure 7B:
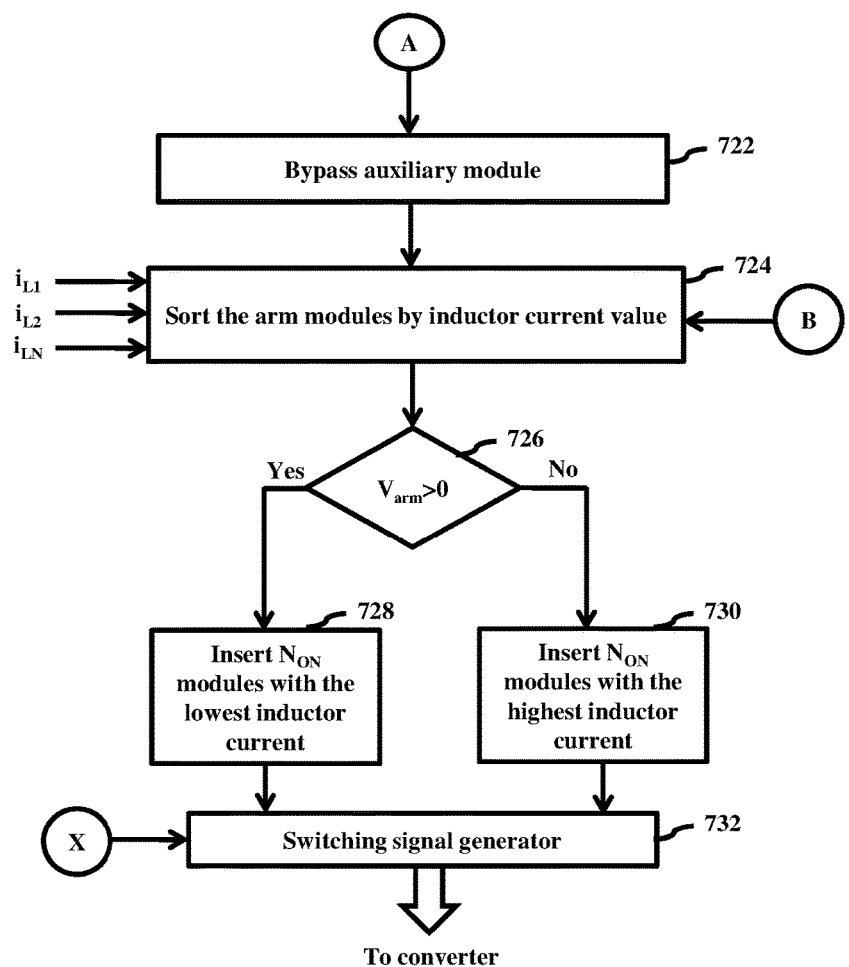
FIG. 7 is a flow diagram illustrating a method of inserting or bypassing an auxiliary full bridge module present in a modular multilevel current source converter and controlling inductor current in the auxiliary full bridge module, according to embodiments as disclosed herein.

FIG. 7 is a flow diagram illustrating a method 700 of inserting or bypassing the auxiliary full bridge module present in the modular multilevel current source converter 600 and controlling inductor current in the auxiliary full bridge module, according to embodiments as disclosed herein. In an embodiment, a reference signal and a carrier signal are obtained from a signal generator. At step 702, the method 700 includes determining the number of modules, $N_{ON}$, to be inserted in an arm and number of levels in the output current. At step 704, the method 700 includes determining whether the number of level in the output current is changed from previous value. In response to determining that the number of level is changed from the previous value, at step 706, the method 700 includes determining whether an intermediate current level is available in the modular multilevel current source converter 600.

In response to determining that the intermediate current level is available, at step 708, the method 700 includes determining whether the inductor current of an auxiliary full bridge module($i_{Laux}$) is greater than a reference inductor current of an auxiliary full bridge module ($i_{Laux}$*). In response to determining that the inductor current is greater than the reference inductor current, at step 710, the method 700 includes determining whether voltage in the arm ($V_{arm}$) is greater than zero. In response to determining that the voltage in the arm is greater than zero, at step 712, the method 700 includes inserting the auxiliary module in the arm with negative direction and increase the number of half bridge modules to be inserted in an arm by one ($N_{ON}=N_{ON}+1$). In response to determining that the voltage in the arm is lesser than zero, at step 714, the method 700 includes inserting the auxiliary module in the arm with positive direction.

In response to determining that the inductor current is lesser than the reference inductor current, at step 716, the method 700 includes determining whether voltage in the arm ($V_{arm}$) is greater than zero. In response to determining that the voltage in the arm is greater than zero, at step 718, the method 700 includes inserting the auxiliary module in the arm with positive direction. In response to determining that the voltage in the arm is lesser than zero, at step 720, the method 700 includes inserting the auxiliary module in the arm with negative direction and increase the number of half bridge modules to be inserted in the arm by one ($N_{ON}=N_{ON}+1$).

In response to determining that the intermediate current level is unavailable, at step 722, the method 700 includes bypassing the auxiliary module in the arm of the modular multilevel current source converter 600. After inserting or bypassing the auxiliary module, at step 724, the method 700 includes sorting the half bridge modules in the arm by the inductor current value. In an embodiment, sorting is performed only when the module is to be inserted or bypassed to reduce the switching losses.

At step 726, the method 700 includes determining whether voltage in the arm ($V_{arm}$) is greater than zero. In response to determining that the voltage in the arm is greater than zero, at step 728, the method 700 includes inserting $N_{ON}$ half bridge modules with the lowest inductor current. In response to determining that the voltage in the arm is lesser than zero, at step 730, the method 700 includes inserting $N_{ON}$ half bridge modules with the highest inductor current.

At step 732, the method 700 includes switching signal generator and loops back to step 702. Further, the switching signals generated using the method 700 is given to the modular multilevel current source converter 600. Further, when the number of level is not changed from previous value as determined in step 704, the method 700 performs the actions as described in step 732.

The detailed simulation verification of a three phase modular multilevel current source converter with auxiliary module is carried out using a Power Systems Computer Aided Design (PSCAD)/EMTDC. The simulation parameters used are given in Table II.

TABLE II

| | |
|---|---|
| DC Link Voltage | 3 kV |
| Module inductance | 500 mH |
| Arm capacitor | 50 uF |
| No of half bridge module/arm | 4 |
| No of auxiliary full bridge module/arm | 1 |
| Switching frequency | 1 kHz |
| Load | 3 mH, 0.9 pf |

Figure 8:
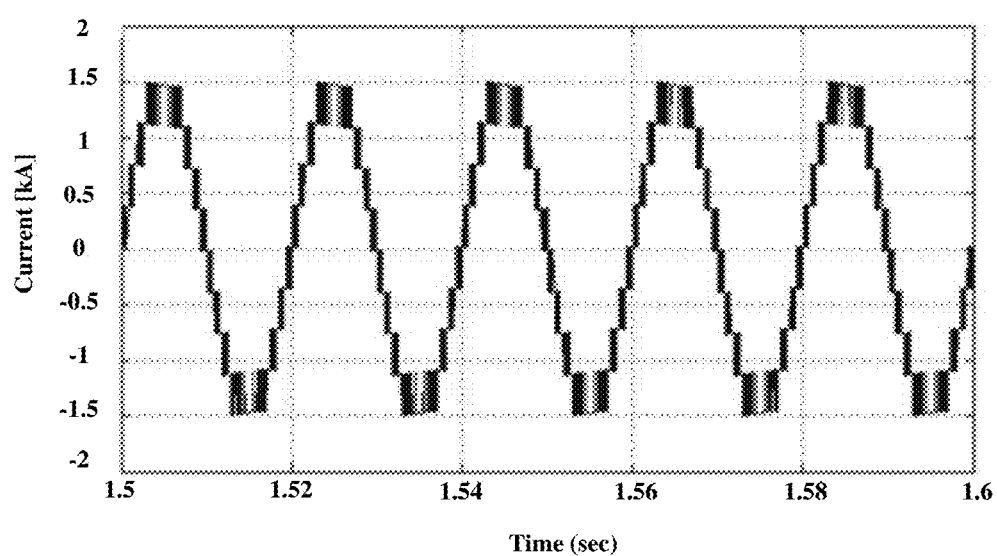
FIG. 8 is a graph showing differential current of upper and lower arms of a modular multilevel current source converter with an auxiliary module, according to embodiments as disclosed herein.

FIG. 8 is a graph showing differential current of upper and lower arm modules of the modular multilevel current source converter 600 with the auxiliary module, according to embodiments as disclosed herein.

Figure 9:
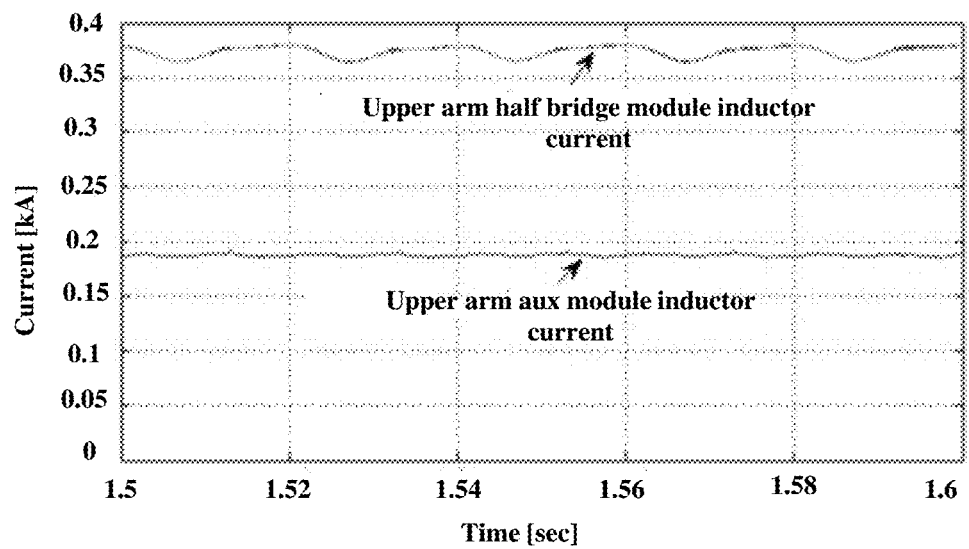
FIG. 9 is a graph showing upper arm half bridge modules and auxiliary module inductor currents of a modular multilevel current source converter, according to embodiments as disclosed herein.
Figure 10:
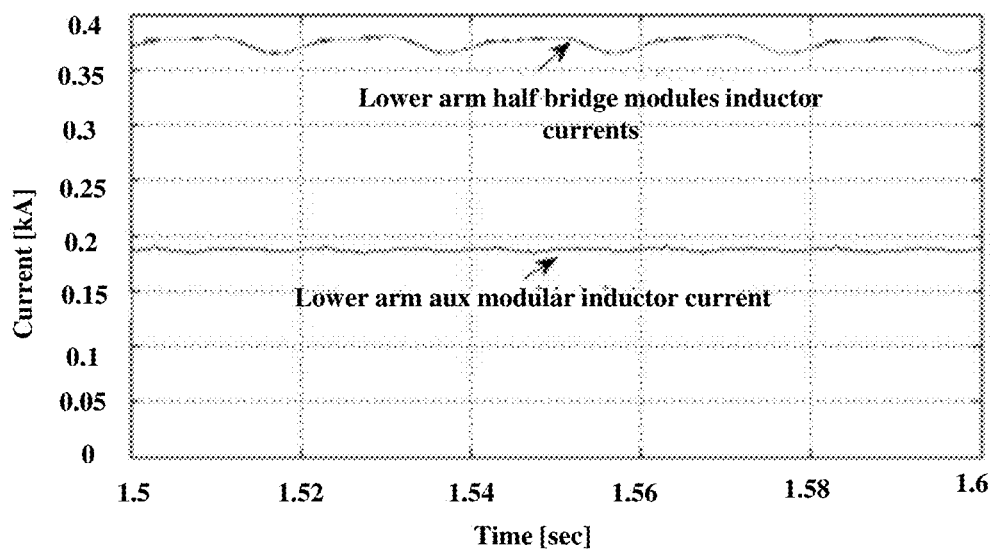
FIG. 10 is a graph showing lower arm half bridge modules and auxiliary module inductor currents of a modular multilevel current source converter, according to embodiments as disclosed herein.

FIG. 9 and FIG. 10 shows the upper and lower arm modules inductor currents, respectively, in the modular multilevel current source converter 600. It can be observed in these figures that the auxiliary module current is maintained at half the half bridge module current to get the intermediate current levels.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A modular multilevel converter configured to: increase one of number of an output voltage level and an output current level, wherein said modular multilevel converter is one of a modular multilevel voltage source converter and a modular multilevel current source converter;

wherein said modular multilevel voltage source converter comprises:
a plurality of legs, wherein each said leg comprises a plurality of arms;
wherein each said arm comprises a main wave shaping (WS) circuit, an auxiliary WS circuit and an arm inductor;
wherein said main WS circuit comprises at least one half bridge sub-module, wherein at least one said half bridge sub-module comprises a capacitor;
wherein said auxiliary WS circuit comprises at least one full bridge sub-module, wherein at least one said full bridge sub-module comprises a capacitor;
wherein said modular multilevel voltage source converter is configured to:
increase number of output voltage levels based on number of said full bridge sub-modules in said auxiliary WS circuit; and
wherein said modular multilevel current source converter comprises:
a plurality of legs, wherein each said leg comprises a plurality of arms;

wherein each said arm comprises a plurality of half-bridge modules connected in parallel, a plurality of arm capacitor connected across said plurality of half-bridge modules and at least one auxiliary full bridge module; and wherein said modular multilevel current source converter is configured to:

increase number of output current levels based on at least one auxiliary full bridge module, wherein said at least one auxiliary full bridge module comprises an inductor and a plurality of semiconductor switches; and wherein said modular multilevel current source converter is configured to insert said auxiliary full bridge modules in order to increase number of said output current levels based on inductor current in said auxiliary full bridge module and polarity of voltage in each arm.

2. The modular multilevel converter of claim 1, wherein said modular multilevel voltage source converter is configured to insert said auxiliary WS sub-modules in order to increase number of said output voltage levels based on capacitor voltage in said auxiliary WS and polarity of current in each arm.

3. The modular multilevel converter of claim 1, wherein said modular multilevel voltage source converter is further configured to balance a voltage of said capacitor in said full bridge sub-module of said auxiliary WS circuit.

4. The modular multilevel converter of claim 1, wherein said modular multilevel current source converter is configured to control said inductor current in said auxiliary full bridge module by: determining whether an intermediate current level is available in said modular multilevel current source converter; and inserting an auxiliary full bridge module present in said modular multilevel current source converter in response to determining that said intermediate current level is available; and controlling said inductor current in said auxiliary full bridge module.

5. The modular multilevel converter of claim 3, wherein said modular multilevel converter voltage source converter is configured to balance said voltage of said capacitor by: determining whether an intermediate level is available in said modular multilevel voltage source converter; measuring a voltage of said capacitor in at least one said full bridge sub-module of said auxiliary WS circuit in response to determining that said intermediate level is available; performing one of: charging said capacitor in at least one of said full bridge sub-module in said auxiliary WS circuit, and discharging said capacitor in at least one of said sub-module in said auxiliary WS circuit by comparing said voltage of said capacitor with a reference voltage of said capacitor.

6. The modular multilevel converter of claim 4, wherein inserting said auxiliary full bridge module comprises: determining whether said inductor current is greater than a reference inductor current; and inserting said auxiliary module in an arm of said modular multilevel current source converter in response to determining that said inductor current is greater than said reference inductor current.

7. The modular multilevel converter of claim 4, wherein said modular multilevel current source converter is further configured to bypass said auxiliary module in said arm of said modular multilevel current source converter in response to determining that said intermediate level is unavailable.

8. The modular multilevel converter of claim 5, wherein said modular voltage source converter is configured to balance said voltage of said capacitor by: measuring a voltage of said capacitor in at least one said full bridge sub-module of said auxiliary WS circuit; determining whether said voltage is lesser than a reference voltage of said capacitor in said auxiliary WS circuit; and charging said capacitor in response to determining that said voltage is lesser than said reference voltage of said capacitor in said auxiliary WS circuit.

9. The modular multilevel converter of claim 5, wherein said modular multilevel voltage source converter is further configured to: bypass said capacitor in at least one said sub-module of said auxiliary WS circuit in response to determining that said intermediate level is unavailable.

10. The modular multilevel converter of claim 6, wherein inserting said auxiliary module in said arm of said modular multilevel current source converter comprises: determining whether voltage in said arm is greater than zero; and inserting said auxiliary module in said arm with negative direction in response to determining that voltage in said arm is greater than zero; and inserting an additional half-bridge module in said arm.

11. The modular multilevel converter of claim 6, wherein said modular multilevel current source converter is further configured to insert said auxiliary module in said arm of said modular multilevel current source converter in response to determining that said inductor current is lesser than said reference inductor current.

12. The modular multilevel converter of claim 8, wherein said modular multilevel voltage source converter is further configured to: discharge said capacitor in response to determining that said voltage is greater than said reference capacitor voltage of said auxiliary WS circuit.

13. The modular multilevel converter of claim 8, wherein said modular multilevel voltage source converter is configured to charge said capacitor in response to determining that said voltage is lesser than said reference capacitor voltage of said auxiliary WS circuit by: determining whether a current in one of: said upper arm, and said lower arm is greater than zero; and inserting at least one said full bridge sub-module in said auxiliary WS circuit positively in response to determining that said current in one of: said upper arm, and said lower arm is greater than zero.

14. The modular multilevel converter of claim 10, wherein said modular multilevel current source converter is further configured to: insert said auxiliary module in said arm with positive direction in response to determining that voltage in said arm is lesser than zero.

15. The modular multilevel converter of claim 11, wherein said modular multilevel current source converter is configured to insert said auxiliary module in said arm of said modular multilevel current source converter by: determining whether voltage in said arm is greater than zero; and inserting said auxiliary module in said arm with positive direction in response to determining that voltage in said arm is greater than zero.

16. The modular multilevel converter of claim 12, wherein said modular multilevel voltage source converter is configured to discharge said capacitor in response to determining that said voltage is greater than said reference capacitor voltage of said auxiliary WS circuit by: determining whether said current in one of: said upper arm, and said lower arm is greater than zero; inserting at least one said sub-module in said auxiliary WS circuit negatively in response to determining that one of: said upper arm, and said lower arm is greater than zero; and incrementing one said sub-module in said main WS circuit.

17. The modular multilevel converter of claim 13, wherein said modular multilevel voltage source converter is further configured to: insert at least one said sub-module in said auxiliary WS circuit negatively in response to determining that one of: said upper arm, and said lower arm is lesser than zero; and increment one said sub-module in said main WS circuit.

18. The modular multilevel converter of claim 15, wherein said modular multilevel current source converter is further configured to: insert said auxiliary module in said arm with negative direction in response to determining that voltage in said arm is lesser than zero; and insert an additional half-bridge module in said arm.

19. The modular multilevel converter of claim 16, wherein said modular multilevel voltage source converter is further configured to: insert at least one said sub-module in said auxiliary WS circuit positively in response to determining that said current in one of: said upper arm, and said lower arm is lesser than zero.

\* \* \* \* \*